(No Model.)

C. J. FOX.
CALF WEANER.

No. 350,877. Patented Oct. 12, 1886.

WITNESSES:
Fred G. Dieterich
P. B. Turpin

INVENTOR:
C. J. Fox
BY Munn & Co
ATTORNEYS.

United States Patent Office.

CYRUS J. FOX, OF FALLS CITY, NEBRASKA.

CALF-WEANER.

SPECIFICATION forming part of Letters Patent No. 350,877, dated October 12, 1886.

Application filed July 10, 1886. Serial No. 207,710. (No model.)

*To all whom it may concern:*

Be it known that I, CYRUS J. FOX, of Falls City, in the county of Richardson and State of Nebraska, have invented a new and useful Improvement in Calf-Weaners, of which the following is a specification.

My invention is an improvement in calf-weaners or devices for preventing calves from sucking; and it consists in the novel construction and combination of parts, as will be hereinafter described.

Figure 1:
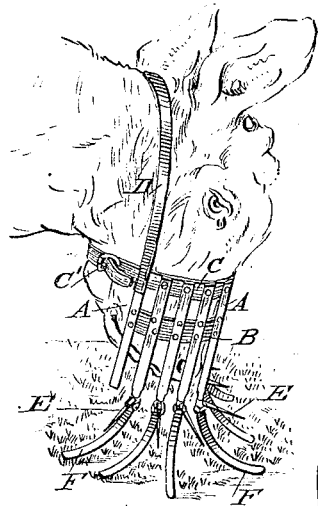
Figure 2:
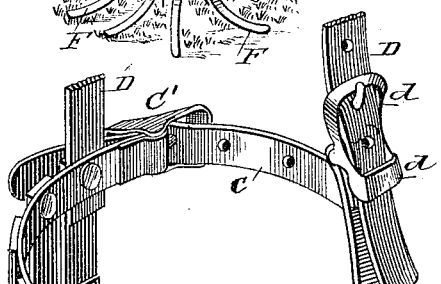
Figure 3:
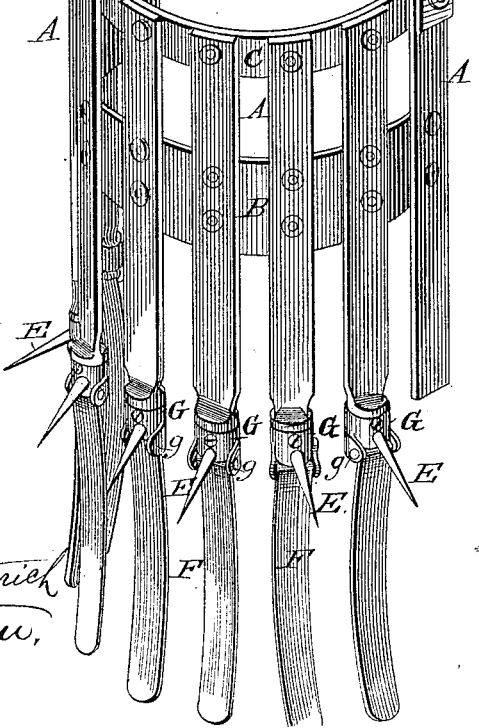
Figure 3:
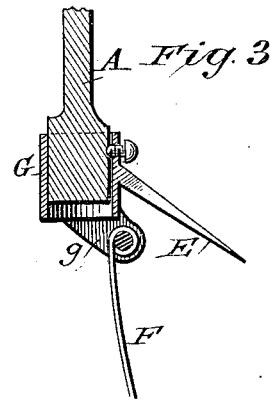

In the drawings, Figure 1 shows the device in position for use. Fig. 2 is a view of the same removed, and Fig. 3 is a detail view showing one of the ferrules and the prong and plate supported thereby.

The improvement is embodied in a rubber headstall which is capable of adjustment in size, and a series of pendent bars, and adapted for attachment in use to the animal's head.

Referring by letter to the accompanying drawings, the pendent bars A are arranged in close relation to each other and parallel, as shown. A connecting-strap, B, joins these bars, preferably, as shown, about midway between their ends. The nose-band C connects the bars at their upper ends, and is provided with means for connecting its opposite ends, preferably a buckle, C', as shown. The neck or head band D is secured to the opposite sides of the device, and is shown as formed in sections, and provided with a buckle, d, for securing the same adjustably.

In use the device is applied to the animal, as shown, and is secured by fastening band C around the nose and band D over the head. The connecting-band, it will be seen, holds the bars together and prevents their lower ends from spreading apart. In use the lower ends of the bars will prevent the animal from sucking, and yet will offer no obstruction to its feeding on grass or out of a trough, as the muzzle will slide readily up the head when it rests down against anything when the head is lowered, and yet will drop down below the nose when the head is raised. The bands C D form a headstall for attaching the device to the head of a calf.

While the described construction may give good results, it is preferred to provide the bars at their lower ends with prongs E and with the hinged extensions F. The prongs extend outward from the bars, near the lower end of the latter, while the extensions F hang down therefrom and are pivoted or hinged at their upper ends, so their lower ends may swing outward and inward. It is preferred to form the prongs and extensions a part of an attachment to the bars, the same consisting of a ferrule, G, adapted to fit and be secured on the lower ends of the bars. In the construction shown the prongs are shown fixed to the ferrules, and the latter are provided with ears $g$ $g$, between which the extensions F are pivoted, and the extensions are shown as thin plates, preferably formed of spring metal and curved outward toward their lower ends. It is usual to round the lower ends of the pendent bars to receive the ferrules and to secure the latter on the bars by screws, so they can be conveniently attached and removed. By providing the attachment as described, the prongs and extensions may be easily applied to and removed from the bars, as desired. These extensions, it will be seen, will turn outward and offer no obstruction to the feeding of the animal in a pasture or from a trough; but they will fall over its mouth and prevent it from sucking. The prongs also, pricking the cow, will cause it to kick and move when the calf attempts to suck.

The device is simple in construction, may be cheaply made, and will be found efficient for the purpose designed. It will be noticed that the bars A are arranged in close relation and in such numbers as to form, substantially, a cover for the front portion of the face of the animal on which the device is used. By "close relation" I mean close together, and in practice I place the said bars a distance of one-half inch apart, as such distance precludes the possibility of the calf drawing a teat between the bars. The band C and connection B are formed of flexible or pliable material, so that they and the attached pendent bars may conform to the head of the animal, and will not abrade or otherwise injure the animal on which the device is used. The ends of the connecting-strap B are disconnected, and such strap serves to join the bars A to prevent their spreading apart at their lower ends, and yet does not in any manner bind the nose portion of the animal on which the device is used.

Having thus described my invention, what I claim as new is—

1. The improved calf-weaner herein described, comprising a nose-band, C, a connection, B, the head-band D, and the bars A, arranged in series and in close relation, whereby to form an inclosure over the lower portion of the face of the animal, the said bars being secured at their upper ends to the band C, and depending thence parallel to each other and secured between their ends to the connection B, substantially as set forth.

2. The combination, in a calf-weaner, of a nose-band, C, a head-band, a series of pendent parallel bars secured at their upper ends to the nose-band and arranged in close relation, and the connection B, secured to and connecting said bars midway their ends, the said connection B and band C being formed of flexible or pliable material, whereby they, with the bars, may conform to the shape of the animal's head, substantially as set forth.

3. The combination, with the pendent bars, of the extensions connected with the lower ends of said bars, and hinged substantially as set forth.

4. As a new and improved article of manufacture, an attachment for calf-weaners, consisting of a ferrule provided with a prong, and a plate hinged or pivoted to said ferrule, substantially as set forth.

5. The combination, in a calf-weaner, of the headstall, the pendent bars, the connecting-strap joining said bars, the ferrules fitted on the lower ends of said bars and provided with prongs, and the extension-plates pivoted to said ferrules, substantially as set forth.

CYRUS J. FOX.

Witnesses:
W. A. GREENWALD,
CREIGHTON MORRIS.